United States Patent [19]

Kessler et al.

[11] Patent Number: 4,856,828
[45] Date of Patent: Aug. 15, 1989

[54] COUPLING ASSEMBLY FOR TUBULAR ARTICLES

[75] Inventors: Newlin W. Kessler; Ray D. Willis, both of Houston, Tex.

[73] Assignee: Tuboscope Inc., Houston, Tex.

[21] Appl. No.: 130,796

[22] Filed: Dec. 8, 1987

[51] Int. Cl.⁴ .............................................. F16L 25/00
[52] U.S. Cl. .................................. 285/334.1; 285/55; 285/371; 285/355; 285/910; 285/915
[58] Field of Search .............. 285/55, 371, 355, 334.1, 285/334.2, 915, 910, 334.3

[56] References Cited

U.S. PATENT DOCUMENTS

| | | | |
|---|---|---|---|
| 2,261,566 | 11/1941 | Russell et al. | 285/371 X |
| 2,487,241 | 11/1949 | Hilton | 285/334.2 |
| 2,635,900 | 4/1953 | Mayo et al. | 285/334.2 X |
| 3,163,448 | 12/1964 | Franklin | 285/371 X |
| 3,266,821 | 8/1966 | Safford | 285/55 X |
| 3,680,188 | 8/1972 | Mason et al. | 285/334.1 X |
| 3,686,747 | 8/1972 | Bagnulo | 285/371 |
| 4,507,842 | 4/1985 | Werner | 285/371 X |
| 4,621,841 | 11/1986 | Wakefield | 285/371 X |
| 4,695,080 | 9/1987 | Oetiker | 285/915 |

FOREIGN PATENT DOCUMENTS 1174208  12/1969  United Kingdom ............... 285/371

Primary Examiner—Dave W. Arola
Attorney, Agent, or Firm—Finnegan, Henderson, Farabow, Garrett & Dunner

[57] ABSTRACT

A coupling assembly having an annular coupling with internal threads in threaded engagement with external threads on opposed tubes inserted into the coupling. An annular gasket of rigid material is mounted between and in engagement with opposed ends of the tubes within the coupling. This gasket has a continuous radial portion extending between these opposed ends of the tubes and a pair of opposed flanges extending from opposite sides of the continuous radial portion and into contact with an interior marginal portion of the opposed tubing ends. Sealing is provided between the opposed ends of the tubes.

2 Claims, 5 Drawing Sheets

COUPLING ASSEMBLY FOR TUBULAR ARTICLES

BACKGROUND OF THE INVENTION

1. Field of the Invention

The present invention relates to a coupling assembly for use in coupling threaded, tubular articles.

2. Description of the Prior Art

In various threaded coupling applications for tubular articles, such as in gas and oil well extraction applications, it is necessary to couple threaded, tubular articles in a manner that ensures a reliable seal between the coupled ends of the tubular articles. In these applications, the tubing has an interior plastic coating for purposes of corrosion resistance. It is difficult, however, with prior-art practices to provide a reliable seal between the coupled ends of the tubings. Consequently, corrosive media passing through the tubing during use thereof in field applications attacks exposed, coupled ends of the tubing where adequate sealing is not obtained.

SUMMARY OF THE INVENTION

It is accordingly an object of the present invention to provide a coupling assembly for coupling threaded tubes that ensures adequate sealing at the tubing ends to prevent attack thereof by corrossive media passing through the tubing.

An additional object of the invention is to provide coupling assembly of this type wherein sealing adequate to protect against corrosion at the coupled tube ends may be achieved without requiring precise threaded engagement between the tubing and the coupling.

Broadly, in accordance with the invention there is provided a coupling assembly comprising an annular coupling having internal threads in threaded engagement with external threads on opposed tubes inserted into the coupling. An annular gasket of rigid material is mounted between and in engagement with opposed ends of the tubes within the coupling. The gasket has a continuous radial portion extending between opposed ends of the tubes and also a pair of opposed flanges extending from opposite sides of the continuous radial portion. These flanges extend into contact with an interior marginal portion extending from each opposed end of the tubes. Sealing means are provided for producing a seal between the opposed ends of the tubes.

The sealing means may comprise a pair of rings of resilient material mounted and compressed on opposite sides of the continuous radial portion of the gasket by the opposed ends of the tubes. The sealing means may alternatively comprise a continuous, annular groove formed between each of the flanges and the continuous radial portion of the gasket. In another embodiment, the sealing means may comprise a mastic applied between contacting surfaces of the flanges and the interior marginal portion of the tubes. Another embodiment of the sealing means comprises substantially corresponding outside diameters of the flanges and inside diameters of the interior marginal portion of the tubes. A further embodiment with respect to the sealing means comprises a plurality of slits provided in the radial portion of the gasket.

The rigid material of the gasket may be polyethylene or polypropylene.

DESCRIPTION OF THE PREFERRED EMBODIMENT

Figure 1:
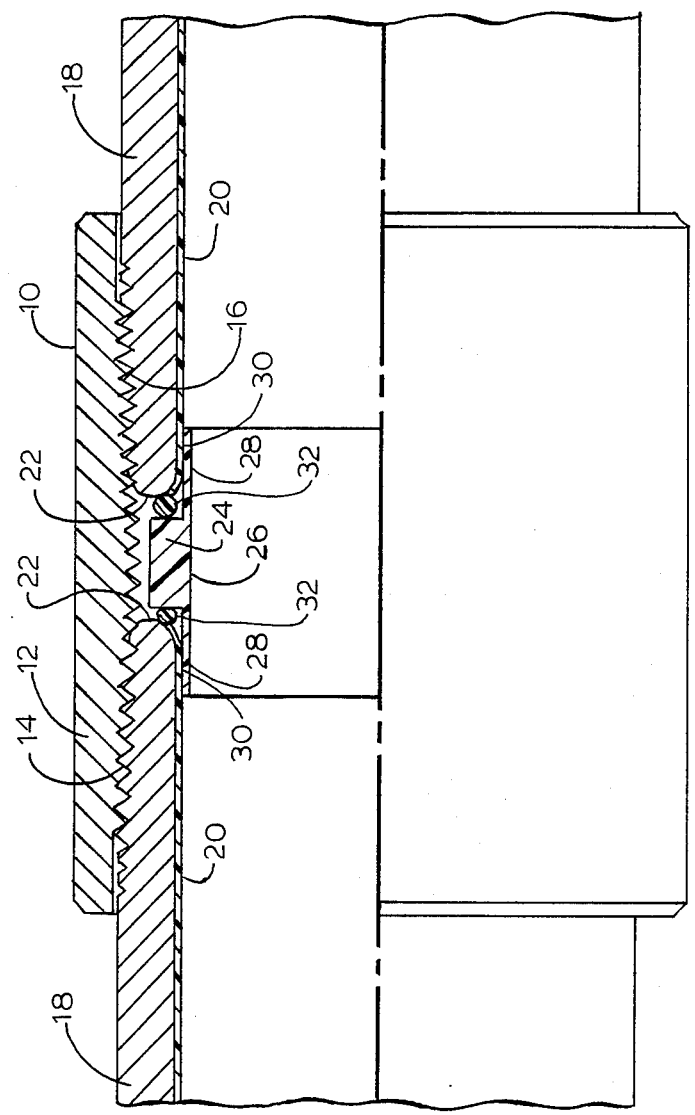
FIG. 1 is a cross sectional view of one embodiment of the coupling assembly of the invention wherein a pair of O-rings are employed as the sealing means.

With reference to the drawings, and for the present to FIG. 1 thereof, there is shown one embodiment of a coupling assembly in accordance with the invention, designated generally as 10. The coupling assembly 10 has an annular coupling 12 with tapered threads 14 in threaded engagement with corresponding threads 16 on each of opposed, coupled, tubes 18. The coupling 12 and tubes 18 may be of any conventional alloy, such as carbon steel. The interior portion of tubes 18 have a continuous plastic, corrosion-resistant coating 20. Between the opposed ends 22 of the tubes 18 is a gasket 24. The gasket 24 is constructed from a rigid material resistant to corrossive attack, such as polyethylene or polypropylene. The gasket 24 is annular with a continuous radial portion 26 with an opposed pair of flanges 28 extending from opposites sides thereof and into contact with a marginal portion 30 extending from each opposed end 22 of the tubes 18. Between the radial portion 26 of the gasket 24 and the ends 22 of each tube 18, there is provided a pair of O-rings 32 of a resilient or compressible material, such as rubber. The O-rings 32 are compressed by the ends 22 of the tubes 18 to provide a tight seal between the tubing ends and the gasket 24. In this manner, corrossive media passing through the tubes 18 is prevented from contacting the ends 22 of these tubes which are not plastic coated and thus would absent sealing hereof be subject to corrossive attack. The tubes 18 are threaded into the coupling 12 a threaded distance sufficient to compress the O-rings 32 to an extent sufficient to provide the desired sealing effect. The unsealed or exposed portion of the interior of tubes 18 is protected from corrossive attack by the plastic coating or liner 20.

Figure 2:
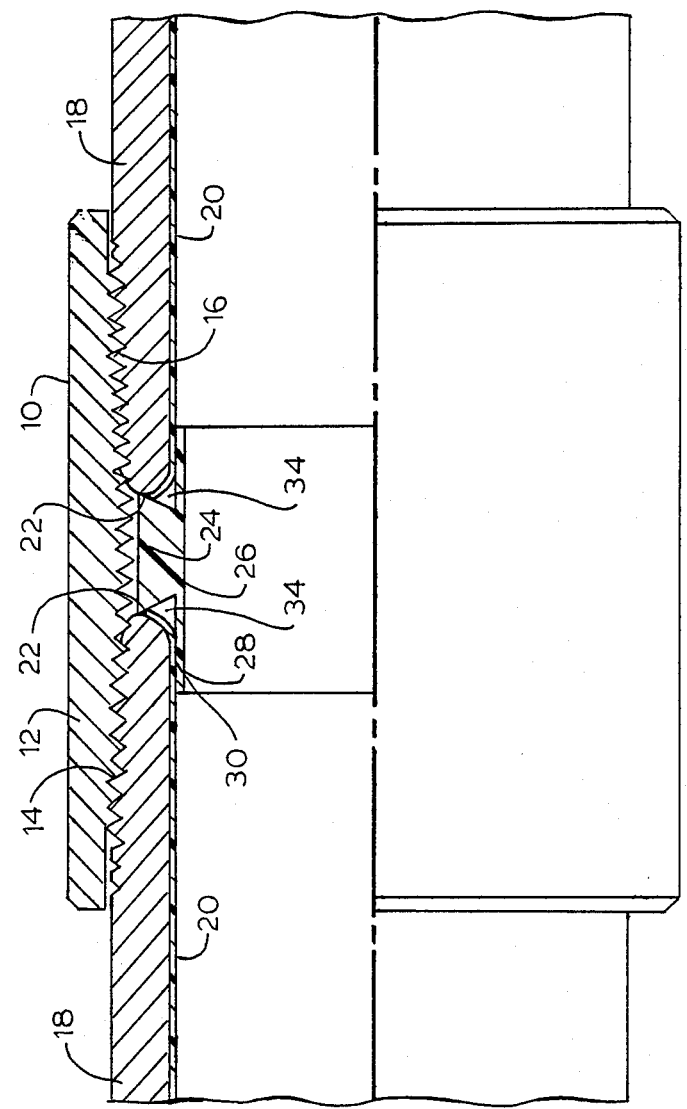
FIG. 2 is a similar view of another embodiment of the coupling assembly of the invention wherein the sealing means includes a continuous, annular groove formed between each of the flanges and the continuous radial portion of the gasket.

In accordance with the embodiment of FIG. 2, the gasket 24 is provided with opposed grooves 34 between the continuous radial portion 26 and flanges 28 thereof. As may be seen from FIG. 2, the ends 22 of the tubes 18 extend into the grooves 34 to produce the required sealing effect.

Figure 3:
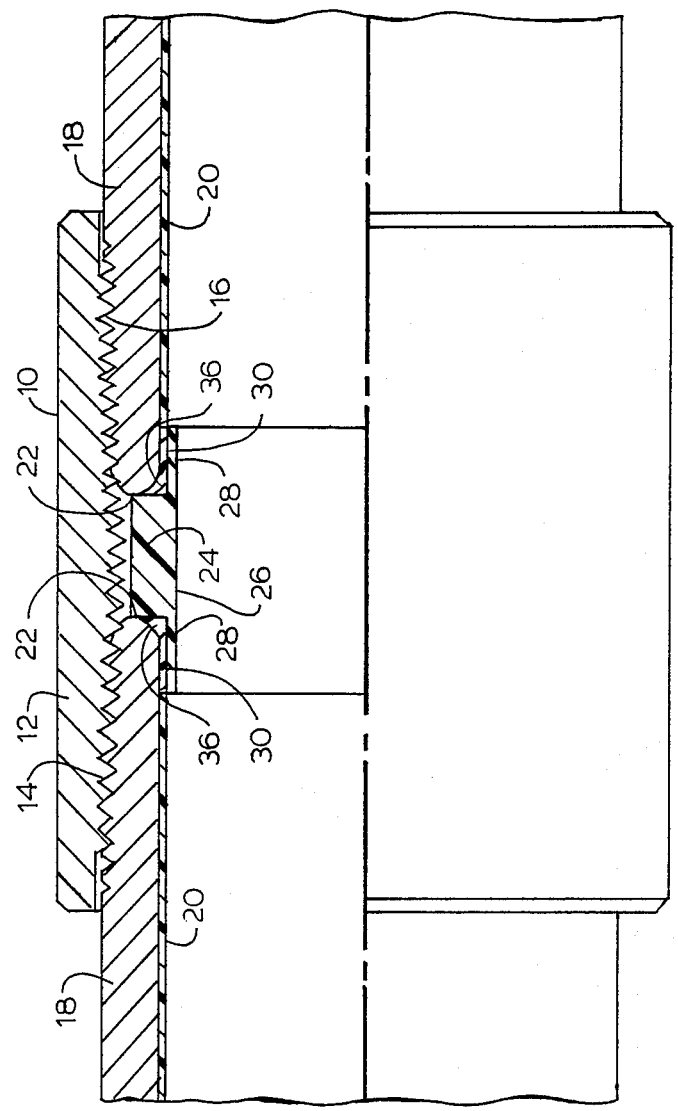
FIG. 3 is a similar view of an additional embodiment of the coupling assembly of the invention wherein the sealing means includes a mastic applied between contacting surfaces of the flanges and the interior marginal portion of the tubes.

In the embodiment of FIG. 3, sealing is achieved by providing a mastic 36 between the flanges 28 and the marginal portion 30 of the tubes 18.

Figure 4:
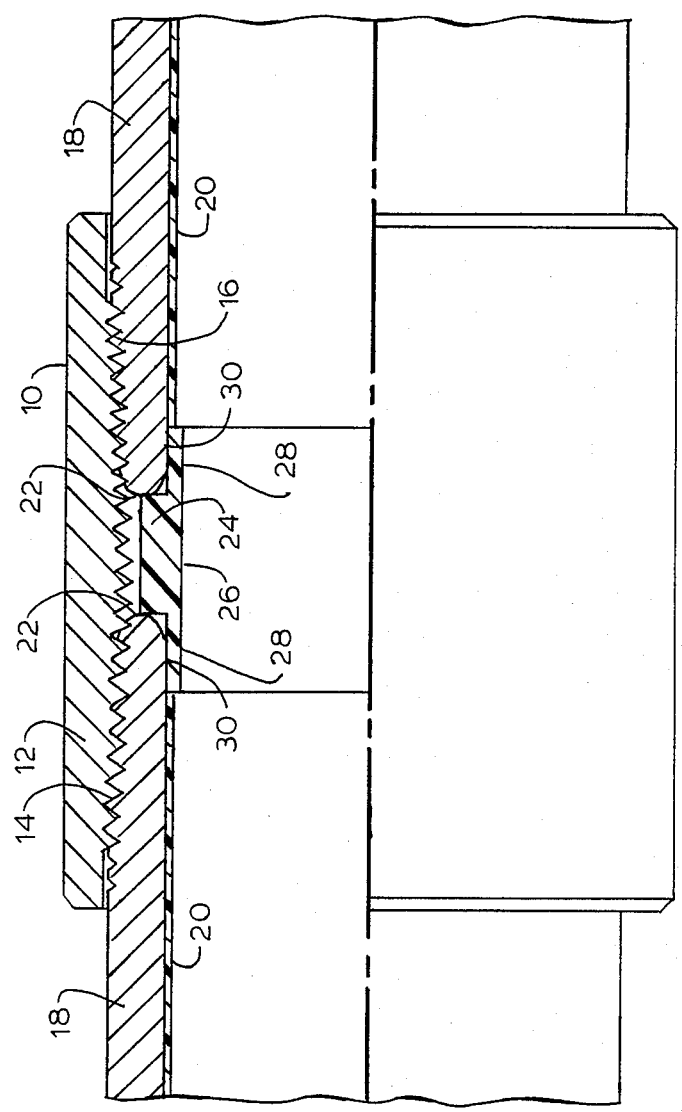
FIG. 4 is a similar view of an additional embodiment of the coupling assembly of the invention wherein the sealing means includes substantially corresponding outside diameters of the flanges and inside diameters of the interior marginal portion of the tubes.

In the embodiment of FIG. 4, sealing is achieved by having the outside diameter of the flanges 28 and the inside diameter of the tubing 18 along the marginal portions 30 thereof of substantially corresponding dimensions. In this manner, sealing is achieved along the corresponding surfaces designated as 38 in FIG. 4.

Figure 5:
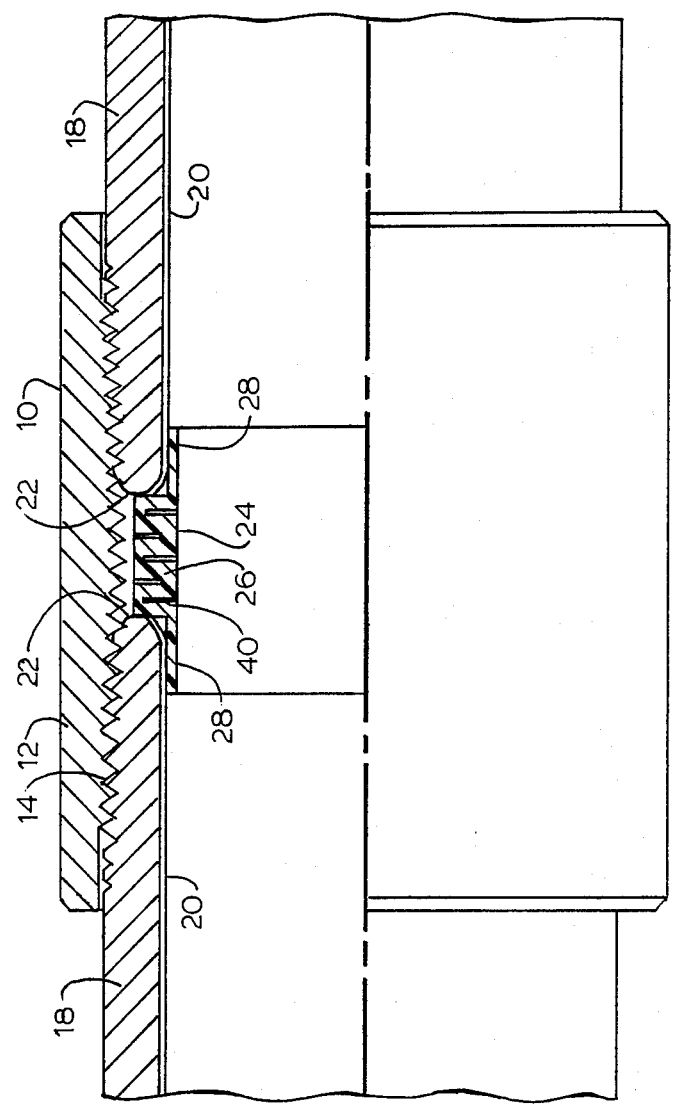
FIG. 5 is an additional embodiment of the coupling assembly of the invention wherein the sealing means includes a plurality of slits provided in the radial portion of the gasket.

In the embodiment of the invention shown in FIG. 5, the continuous radial portion 26 of the gasket 24 is provided with a plurality of slits 40. With the opposed ends 22 of tubes 18 being threaded into the coupling 12 with a threaded distance sufficient to compress the continuous radial portion, the slits 40 provide for yielding thereof to ensure and establish a seal at each end 22 of the tubing with the continuous radial portion 26 of the gasket 24. With this embodiment, the gasket 24 may be constructed from rigid material and yet yielding thereof sufficient to provide the required sealing is achieved by the use of the slits 40.

As may be seen from the above-described embodiments of the invention, the coupling assembly thereof enables the use of a gasket of rigid material and yet with the sealing means used in association thereof adequate sealing is achieved. Consequently, it is possible to use a gasket of material that is rigid and thus durable in applications such as gas and oil well extraction, particularly from the standpoint of corrosion resistance. With conventional coupling assemblies requiring the use of resilient or compressible gaskets for sealing purposes, degradation of the material of the gasket results when subjected to the corrossive media passing through the tubes.

What is claimed is:

1. A coupling assembly comprising an annular coupling having internal threads and opposed tubes having external threads inserted into said coupling with said internal threads and said external threads being in threaded engagement, an annular gasket of rigid material mounted between and in engagement with opposed ends of said tubes within said coupling, said gasket having a continuous radial portion extending between said opposed ends of said tubes, said radial portion having opposed side portions adjacent said opposed ends and a top portion spaced apart from said coupling, and a pair of opposed flanges extending from opposite sides of said continuous radial portion of said gasket and into sealing contact with an interior marginal portion extending from each opposed end of said tubes and sealing means for producing a seal between said opposed ends of said tubes and each said opposed side portions of said radial portion, said sealing means being spaced apart from said coupling and including a continuous, annular groove formed between each of said flanges and said continuous radial portion of said gasket with each said opposed ends of said tubes extending into one said groove in sealing engagement with said gasket.

2. A coupling assembly comprising an annular coupling having internal threads and opposed tubes having external threads inserted into said coupling with said internal threads and said external threads being in threaded engagement, an annular gasket of rigid material mounted between and in engagement with opposed ends of said tubes within said coupling, said gasket having a continuous radial portion extending between said opposed ends of said tubes, said radial portion having opposed side portions adjacent said opposed ends and a top portion spaced apart from said coupling, and a pair of opposed flanges extending from opposite sides of said continuous radial portion of said gasket and into sealing contact with an interior marginal portion extending from each opposed end of said tubes and sealing means for producing a seal between said opposed ends of said tubes and each said opposed side portions of said radial portion, said sealing means being spaced apart from said coupling and including a plurality of slits provided in said radial portion of said gasket with each said opposed end of said tubes extending into contact with said radial portion to compress said radial portion into sealing engagement with said opposed tube ends.

* * * * *